United States Patent
Oishi

(10) Patent No.: US 7,346,039 B2
(45) Date of Patent: Mar. 18, 2008

(54) COMMUNICATION SYSTEM

(75) Inventor: Takumi Oishi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1138 days.

(21) Appl. No.: 10/372,289

(22) Filed: Feb. 25, 2003

(65) Prior Publication Data

US 2004/0081109 A1 Apr. 29, 2004

(30) Foreign Application Priority Data

Oct. 29, 2002 (JP) ............................. 2002-314124

(51) Int. Cl.
*H04Q 7/20* (2006.01)
*H04L 12/28* (2006.01)
*H04L 12/56* (2006.01)
*H04L 12/66* (2006.01)

(52) U.S. Cl. ...................... 370/338; 370/349; 370/352; 370/401; 455/411; 455/432.1; 455/445

(58) Field of Classification Search ................ 370/338, 370/349, 352, 401; 455/411, 432.1, 445
See application file for complete search history.

(56) References Cited

U.S. PATENT DOCUMENTS

| | | | | |
|---|---|---|---|---|
| 6,151,628 | A * | 11/2000 | Xu et al. ..................... | 709/225 |
| 6,466,571 | B1 * | 10/2002 | Dynarski et al. ............ | 370/352 |
| 6,496,704 | B2 * | 12/2002 | Yuan ........................... | 455/466 |
| 6,636,491 | B1 * | 10/2003 | Kari et al. ................... | 370/328 |
| 6,654,359 | B1 * | 11/2003 | La Porta et al. ............ | 370/328 |
| 6,763,007 | B1 * | 7/2004 | La Porta et al. ............ | 370/331 |
| 7,146,636 | B2 | 12/2006 | Crosbie | |
| 2001/0041571 | A1 | 11/2001 | Yuan | |
| 2002/0076054 | A1 * | 6/2002 | Fukutomi et al. ........... | 380/277 |
| 2002/0126642 | A1 * | 9/2002 | Shitama ...................... | 370/338 |
| 2004/0002337 | A1 * | 1/2004 | Wheeler et al. ............. | 455/445 |

FOREIGN PATENT DOCUMENTS

EP 0 910 198 A-2 10/1998

(Continued)

OTHER PUBLICATIONS

"Actual Utilization of Hotspot Service", Nikkei Communications, Apr. 15, 2002, pp. 120-127.

(Continued)

*Primary Examiner*—Alpus H. Hsu
(74) *Attorney, Agent, or Firm*—Reed Smith LLP; Stanley P. Fisher, Esq.; Juan Carlos A. Marquez, Esq.

(57) ABSTRACT

A roaming service covering a plurality of telecommunications carriers in mobile data communication is provided. In a communication system including a wireless terminal, two or more terminal-side networks communicating with the wireless terminal, and a backbone-side network connected to the terminal-side networks and connecting the wireless terminal with a backbone network, the wireless terminal traveling between the terminal-side networks during communication, wherein each of the terminal-side networks has a relay device for relaying communication between the wireless terminal and the backbone-side network and wherein the backbone-side network has a position management device for managing positional information of the wireless terminal and an authentication device for authenticating the wireless terminal according to contract information of the wireless terminal.

9 Claims, 17 Drawing Sheets

FOREIGN PATENT DOCUMENTS

| | | |
|---|---|---|
| EP | 0 944 203 A-2 | 1/1999 |
| EP | 1 011 241 A-1 | 11/1999 |
| WO | WO 02/077820 A1 | 3/2002 |

OTHER PUBLICATIONS

"IP Mobility Support for IPv4", Aug. 2002, http://www.ietf.org/rfc3344.txt, pp. 9-13, 55, 64-66.

European Search Report, dated Feb. 17, 2004.

Perkins, C., "IP Mobility Support for IPv4", Network Working Group, (Aug. 2002), pp. 1-99.

European Examination Report dated Jul. 18, 2005.

Ala-Laurila, J. et al., "Wireless LAN Access Network Architecture for Mobile Operators", IEEE Communications Magazine, (Nov. 2001), pp. 82-89.

* cited by examiner

| HOME ADDRESS | CARE-OF ADDRESS | LIFE DURATION |
|---|---|---|
| 2002:1001::1 | — | 6 |
| 2002:1103::1 | 2123:4567:::1 | 5 |
| 2002:1208::1 | 2234:5678:::1 | 5 |
| : | : | : |
| : | : | : |
| : | : | : |

FIG. 7

| USER NAME | PASSWORD |
|---|---|
| Alice | ******** |
| bob | ********* |
| charlie | ******** |
| : | : |
| : | : |
| : | : |

| EDGE ROUTER ID | PREFIX | HA ADDRESS |
|---|---|---|
| P0001 | 2002:1001::/16 | 2002:1001:FFFF::500 |
| Q0003 | 2002:1103::/16 | 2002:1103:FFFF::500 |
| R0008 | 2002:1208::/16 | 2002:1208:FFFF::500 |
| : | : | : |
| : | : | : |
| : | : | : |

135, 136, 137

| 200 | IPV6 BASIC HEADER |
| 204 | SEQUENCE NUMBER |
| 205 | USERNAME@MISPNAME |
| 206 | PASSWORD |
| 207 | EDGE ROUTER ID |

| PREFIX OF SOURCE ADDRESS (130) | HA ADDRESS (131) |
|---|---|
| 2002:FFFF::/64 | 2002:FFFF::1 |
| 3000:FFFF::/64 | 3000:FFFF::3 |
| 2800:6700:1234::/64 | 2800:6700:1234::2 |
| ⋮ | ⋮ |

COMMUNICATION SYSTEM

BACKGROUND OF THE INVENTION

The present invention relates to a network service providing system, and more particularly to a roaming service providing system covering a plurality of telecommunications carriers in mobile data communications.

In recent years, a hotspot, which is an Internet-access service using a wireless LAN system, is rapidly diffused. This type of Internet-access service using the wireless LAN system uses the wireless LAN system for an access line used by a user terminal and makes an access from there to the Internet via an existing packet switching network, an Internet service provider (ISP), or the like. Referring to FIG. 27, there is shown an example of a configuration of the Internet-access service using the wireless LAN system. If a user terminal (CPE) 5 communicates with the other party (CN) 6 on the other end of the Internet 7, it goes through a network 9 managed by a public wireless LAN service provider using a wireless LAN. If so, the user is authenticated by an authentication server 11 and then starts communication with the other party 6 on the Internet 7 after the authentication is completed.

The existing hotspot service providers mainly cover Internet accesses from fixed points at this moment: only a few hotspot service providers provide handover services for communications while traveling between a plurality of access points (radio base stations), in other words, traveling between a plurality of radio base stations. Seen from the user's standpoint, however, we need the handover services providing continuous Internet accesses for communications while traveling, as is the case with cell phones.

In addition, traveling between access points owned by a plurality of providers, in other words, roaming services are not provided at present. Since international roaming services are currently provided in cell phones, roaming services are also necessary in the hotspot services, seen from the user's standpoint.

To receive a roaming service in addition to the handover service in data communications, a user needs to contract with a telecommunications carrier having access facilities such as a specific wireless LAN through which the handover service is provided and to wait for the telecommunications carrier to start the roaming service at present. Even if the roaming service is started in this case, the roaming range depends upon the telecommunications carrier with which the user contracted. It is because a user's position should be managed that the user needs to contract with the specific telecommunications carrier. In other words, even if the user has been roaming an area under another telecommunications carrier, the telecommunications carrier contracting with the user always manages the user's position. The necessity of managing the user's position at a particular place is a technical constraint in realizing mobile data communications.

As prior art of hotspot service, there is a nonpatent literature 1;

Apr. 15, 2002 issue of Nikkei Communications ("Actual Utilization of Hotspot Service" on pages 120 to 127)

SUMMARY OF THE INVENTION

Although a roaming service can be provided led by a public wireless LAN service provider (PWC) or a mobile communication service provider (MCC) in providing a mobile data communication service to a user, an Internet-access service provider (ISP) cannot provide the roaming service independently using facilities of the PWC or MCC.

It is an object of the present invention to provide a network system capable of resolving the problem.

In accordance with a first aspect of the present invention, there is provided a roaming service providing system in which a home agent (HA) for managing a user's position is set up in a mobile Internet-access service provider (MISP) for providing a roaming service covering a plurality of PWCs or MCCs.

A device for managing information on contracts with users (authentication server) is installed in the MISP, while a authentication relay device linking up with the authentication server (authentication relay server) is installed in each of the PWCs and the MCCs Furthermore, in each PWC or MCC, a device (edge router) for communicating with a user communication terminal directly using the Internet protocol (IP) is provided with an additional function of appending or deleting path information specifying devices to be certainly passed through to or from a packet meeting a certain condition.

According to the present invention, a provider having no wireless LAN nor facilities for accesses with cell-phone or other device users can provide a roaming service covering a plurality of telecommunications carriers by using wireless LANs or cell-phone or other facilities of the telecommunications carriers.

In addition, a user can use the Internet or any other network using facilities of a plurality of wireless access providers by contracting only with a single roaming service provider according to the present invention, instead of contracting with the plurality of wireless access providers.

Other objects, features and advantages of the invention will become apparent from the following description of the embodiments of the invention taken in conjunction with the accompanying drawings.

BRIEF DESCRIPTION OF THE DRAWINGS

FIG. 7 is a list showing an example of contract information 124;

FIG. 8 is a list showing an example of prefix information 125;

DESCRIPTION OF THE EMBODIMENTS

The preferred embodiments of the present invention will now be described in detail hereinafter with reference to the accompanying drawings.

Figure 1:
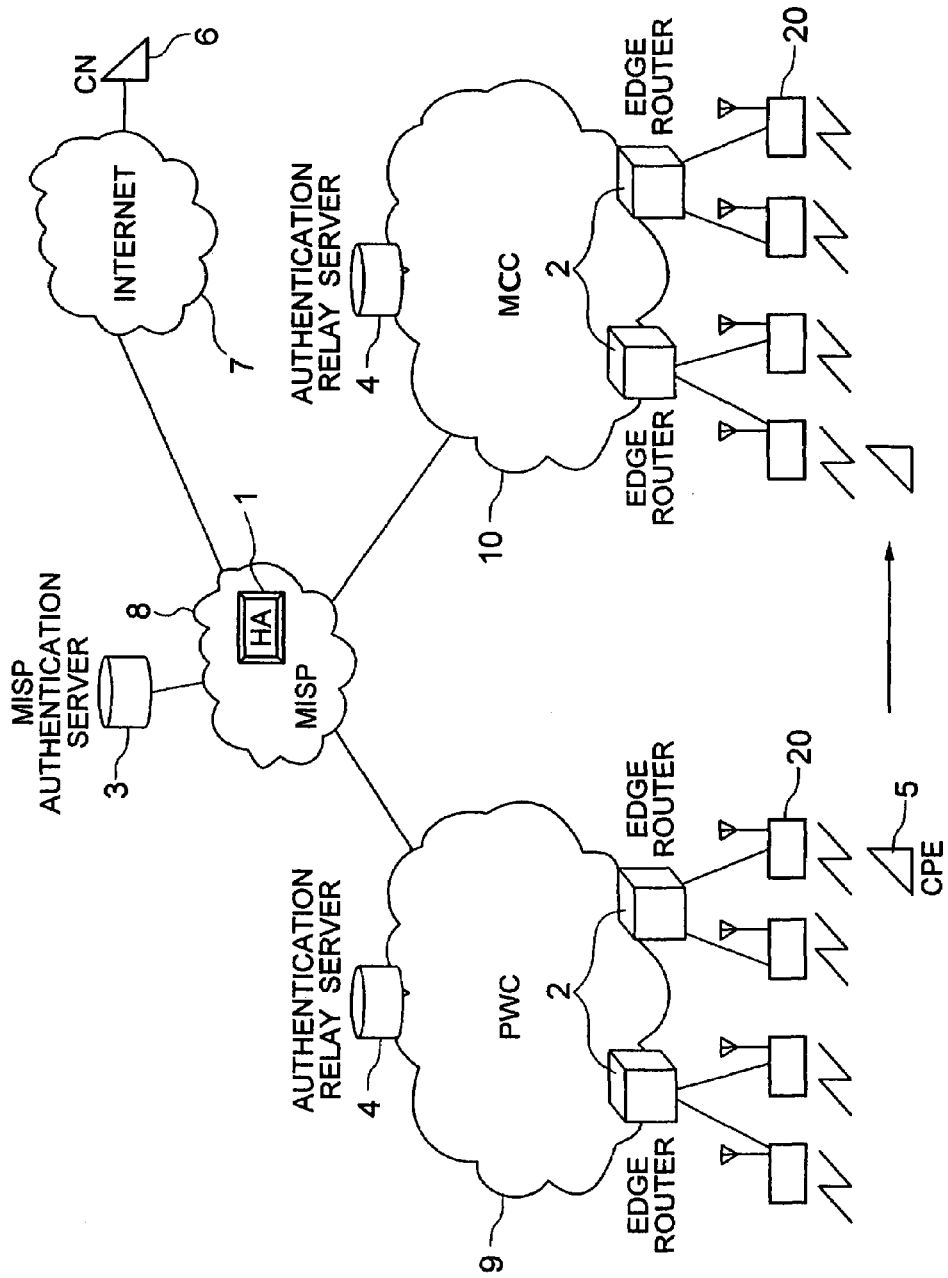
FIG. 1 is a schematic diagram showing an outline of a system according to an embodiment of the present invention.

Referring to FIG. 1, there is shown a schematic diagram illustrating an outline of a system according to an embodiment of the present invention.

The system is configured in such a way that a user's CPE 5 is connected to a mobile Internet service provider (MISP) 8 for providing a roaming service covering a public wireless LAN service provider (PWC) 9 and a mobile communication service provider (MCC) 10, so that the CPE 5 communicates with the other end of the line (CN) 6. While there is shown the roaming service covering the public wireless LAN service provider (PWC) 9 and the mobile communication service provider (MCC) 10, the public wireless LAN service provider (PWC) and the mobile communication service provider (MCC) are shown only as an example of providers communicating with users and therefore a roaming service between PWCs or between MCCs can also be provided according to the present invention.

The PWC 9 is a provider for providing a public wireless LAN service such as a hotspot, for example, and the MCC 10 is a provider for providing a mobile communication service such as a cell-phone service provider, for example. Each of the PWC 9 and the MCC 10 comprises a radio base station 20 performing a wireless communication with the CPE 5, an edge router 2 connected to the radio base station 20 to communicate with the CPE 5 in IP, and an authentication relay server 4 for relaying communication between the CPE 5 and the destination CN 6 on the Internet 7 linking up with an authentication server 3 described later. The edge router 2 has a function of managing the correspondence between a prefix and an address of an HA 1 owned by the mobile Internet service provider (MISP) 8 having assigned the prefix and a function of generating the address correspondence from a packet exchanged between the CPE 5 and the authentication server 3. The authentication relay server 4 manages the relay function of the packet exchanged between the CPE 5 and the authentication server 3 and the correspondence between a name of the MISP 8 and an address of the authentication server 3 owned by the MISP 8.

The MISP 8 is a service provider connecting the CPE 5 with the Internet 7 each other for a communication and comprises the home agent (HA) 1 and the authentication server 3. The HA 1 manages positional information of the CPE 5. The authentication server 3 is provided for authenticating the CPE 5. The authentication server 3 manages the correspondence between a user ID and a password or other contract information to the user ID and between an edge router ID and a prefix to the edge router ID. The HA 1 manages the correspondence between an address assigned to the CPE 5 by the authentication server 3 (home address) and an address assigned after roaming (care-of address). Additionally it has a function of rewriting a packet addressed to the home address into a packet to the care-of address (Refer to http://www.ietf.org/rfc3344.txt).

Figure 2:
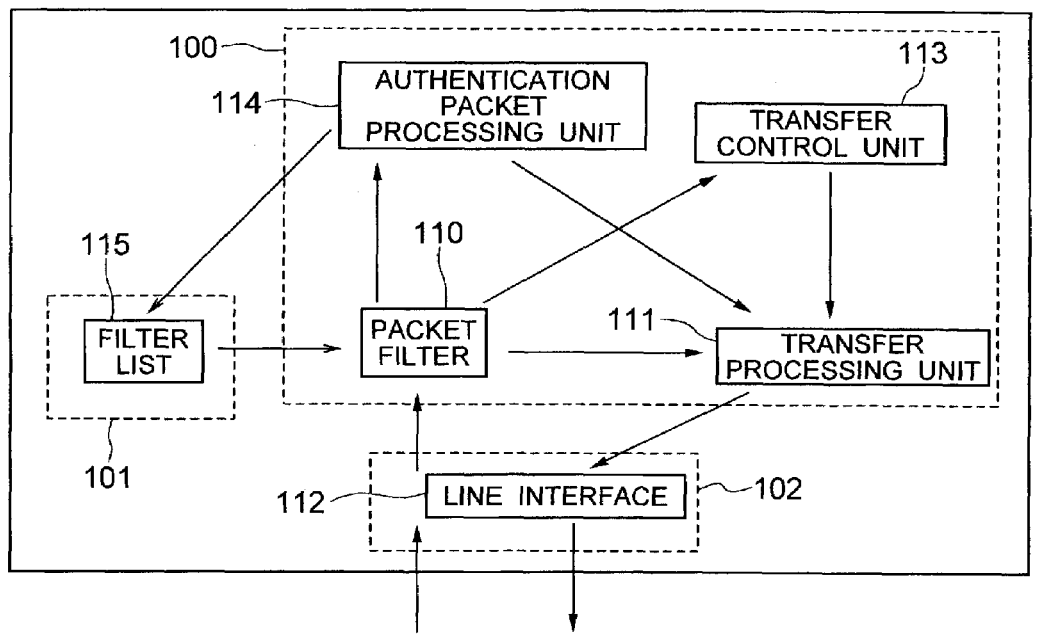
FIG. 2 is a functional block diagram showing details of an edge router 2.

Referring to FIG. 2, there is shown a functional block diagram illustrating details of the edge router 2.

A line interface 112 is for use in transmitting or receiving a packet. A packet filter 110 selects a packet out of received packets by referencing a filter list 115. The selected packet is transmitted to a transfer processing unit 111, a transfer control unit 113, and an authentication packet processing unit 114. The transfer processing unit 111 performs transfer processing on the basis of a packet destination address. The transfer control unit 113 performs path control processing described later. The authentication packet processing unit 114 monitors an authentication packet exchanged between the CPE 5 and the authentication server 3.

Figure 3:
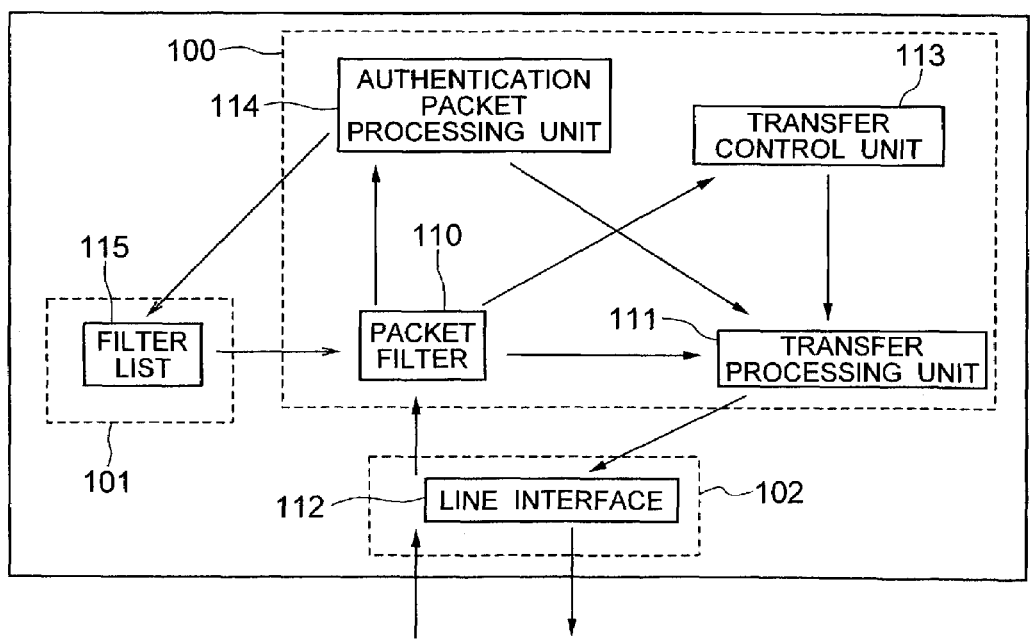
FIG. 3 is a functional block diagram showing details of an HA 1.

Referring to FIG. 3, there is shown a functional block diagram illustrating details of the HA 1.

Figures 4, 5:
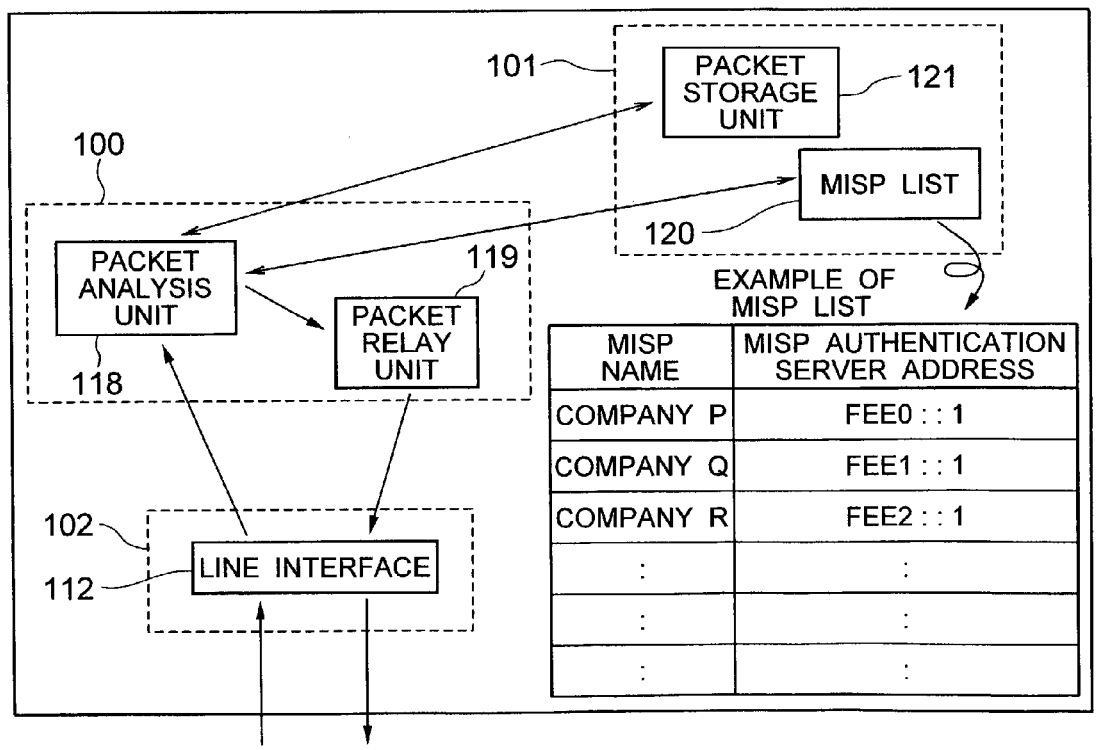
FIG. 4 is a list showing an example of a binding cache 109.
FIG. 5 is a functional block diagram showing details of an authentication relay server.

The line interface 112 is for use in transmitting or receiving a packet. The packet filter 110 selects a packet out of received packets and then transmits it to a binding processing unit 116, an encapsulation processing unit 117, and the transfer processing unit 111. Upon receiving a position registration request from the CPE 5, the binding processing unit 116 performs the position registration processing described later. The encapsulation processing unit 117 performs path control processing and encapsulation processing. The path control processing and the encapsulation processing will be described later. The transfer processing unit 111 performs transfer processing on the basis of the destination address of the packet. As shown in FIG. 4, a binding cache 109 is a list showing a correspondence of a home address, a care-of address, and life duration (expiration date of the correspondence between the home address and the care-of address).

Referring to FIG. 5, there is shown a functional block diagram showing details of the authentication relay server.

The line interface 112 is for use in transmitting or receiving a packet. A packet analysis unit 118 compares a content of a packet whose authentication is requested from a user with the MISP list and the packet storage unit 121 and determines to which authentication server the CPE 5 performs the authentication. The MISP list 120 shows the correspondence between the MISP and the authentication server address. A packet relay unit 119 generates an authentication request packet addressed to the determined authentication server and then transmits it to the line interface 112.

Figure 6:
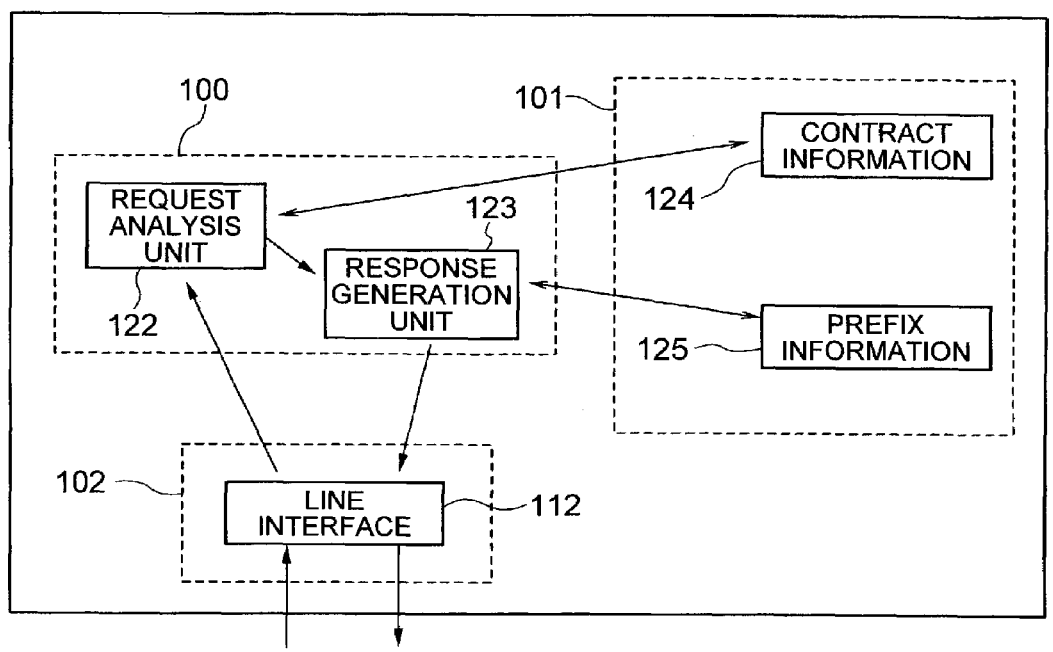
FIG. 6 is a functional block diagram showing details of an authentication server 3 installed in an MISP.

Referring to FIG. 6, there is shown a functional block diagram illustrating details of the authentication server 3 installed in the MISP.

The line interface 112 is for use in transmitting or receiving a packet. A request analysis unit 122 compares the authentication request packet from the CPE 5 with contract information 124 for authentication and transmits information on whether the authentication is successful or unsuccessful to a response generation unit 123. The content of the contract information comprises a user name and a password as shown in FIG. 7. If the authentication is successful, the response generation unit 123 generates an authentication success packet as a response by referencing prefix information 125. Otherwise, it generates an authentication failure packet. The authentication success packet or the authentication failure packet is sent to the line interface 102 and then transmitted to the CPE 5. As shown in FIG. 8, a content of the prefix information is a list showing the correspondence of an edge router ID 135, a prefix 136, and an HA address 137.

The contract information 124 is generated when a user of the CPE 5 contracts with the MISP 8. The prefix information 125 is generated when the MISP 8 contracts with the PWC 9 or the MCC 10.

The following describes an operation of the embodiment configured as described above.

If a roaming service is provided in the system according to this embodiment, the following two points are required; a packet is reliably transmitted to a user and the user is authenticated wherever the user is.

To achieve the former packet transfer, the HA 1 for managing the CPE 5 position is installed in the MISP 8. Additionally, for a communication between users under contract to the same MISP, the system is configured so that a packet transmitted from the CPE 5 always passes through the MISP network. For this purpose, the edge router 2 communicating directly with the CPE 5 in IP is provided with a path control function.

In addition, to achieve the latter user authentication, the authentication relay server 4 is installed in each of the PWC 9 and MCC 10 networks so as to link up with the authentication server 3 of the MISP 8. The user needs to contract only with the MISP 8 and can connect to the Internet via a plurality of PWC and MCC networks. Note that, however, the MISP 8, the PWC 9, and the MCC 10 are assumed to have previously contracted with each other for providing the roaming service according to the present invention to link up with each other.

The following describes the user authentication operation that the CPE 5 performs to the MISP 8.

Figure 9:
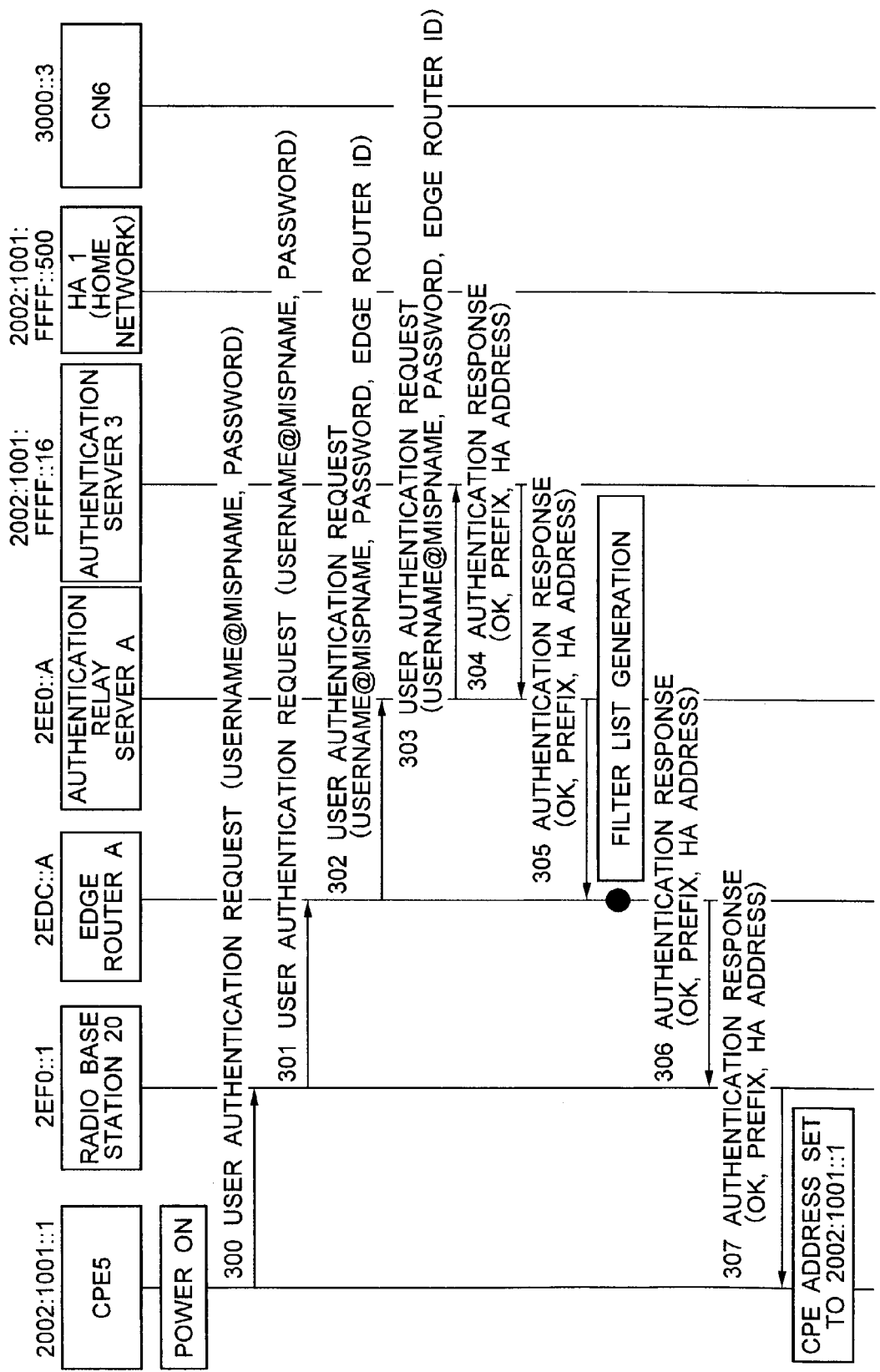
FIG. 9 is a sequence diagram showing a processing flow of authentication that the CPE 5 performs to the MISP.

Referring to FIG. 9, there is shown a sequence diagram illustrating a processing flow in the authentication that the CPE 5 performs to the MISP 8.

Figure 10:
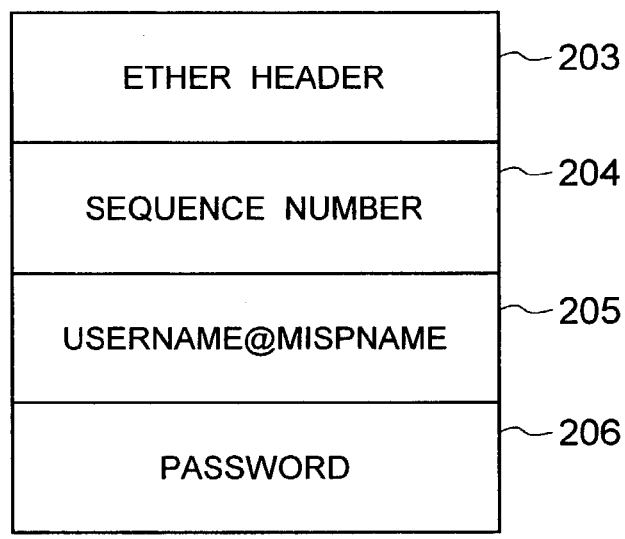
FIG. 10 is a format diagram showing an authentication request packet 300.
Figure 11:
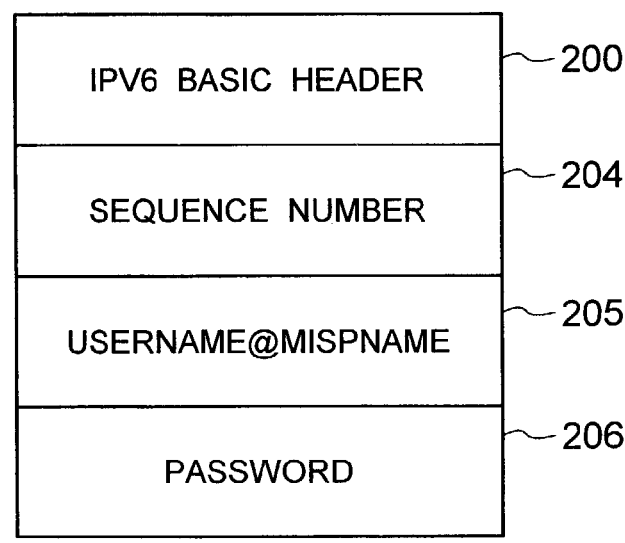
FIG. 11 is a format diagram showing an authentication request packet 301.

When the CPE 5 transmits an authentication request packet 300, the radio base station 20 relays it by sending an authentication request packet 301 to the edge router 2. As shown in FIG. 10, a format of the authentication request packet 300 comprises a packet transmission source, an Ether header 203 indicating a destination address or the like, a sequence number 204, username@MISPname 205 indicating a mobile Internet service provider name connected to a user name, and a password 206 authenticated as a valid user. Note that the CPE 5 generally does not use an IP address for communication with the radio base station 20 and therefore the Ether header 203 with an MAC address preset to the transmission source or destination is used instead of an IP basic header. As shown in FIG. 11, a format of the authentication request packet 301 comprises a packet transmission source, IPv6 (Internet Protocol Ver. 6) basic header 200 indicating a destination address or the like, a sequence number 204, username@MISPname 205, and a password 206.

Figures 12, 13:
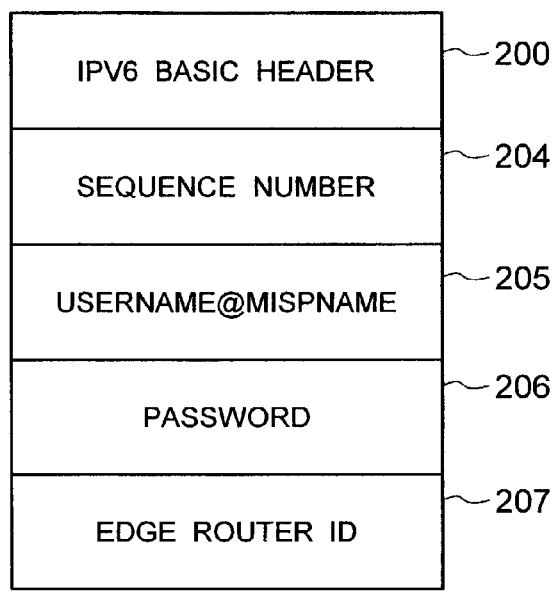
FIG. 12 is a format diagram showing an authentication request packet 302.
FIG. 13 is a list showing an example of a filter list 115.

The edge router A generates an authentication request packet 302 containing its own edge router ID 207 in addition to the authentication request packet 301 and transmits it to the authentication relay server 4. This processing will be described later. As shown in FIG. 12, a format of the authentication request packet 302 comprises the authentication request packet 301 and the edge router ID 207.

Upon receiving the authentication request packet 302, the authentication relay server 4 reads the MISP name 205 contained in the packet and retrieves the address of the authentication server 3 owned by the MISP 8 from the MISP list 120. The MISP list 120 shows the correspondence between the MISP name and the authentication server address information: for example, a user previously registers them on the authentication relay server 4 before contracting with the MISP 8 for the PWC 9 or the MCC 10. Confirming an address of the authentication server 3 on the MISP list 120, the authentication relay server 4 transmits the authentication request packet 302 to the address of the authentication server 3 as an authentication request packet 303. A format of the authentication request packet 303 has the same structure as of the authentication request packet 302 shown in FIG. 12. An authentication relay processing performed by the authentication relay server 4 will be described later.

Upon receiving the authentication request packet 303, the authentication server 3 compares "username@MISPname" and the "password" in the packet with the contract information 124 to perform the user authentication. Details of the authentication processing will be described later. If the user authentication is successful, the authentication server 3 generates an authentication response packet 304 storing a prefix (high-order 64 bits of the address) 209 allocated to the CPE 5 and a home agent address (HA address) 210 corresponding to the CPE 5 and then transmits it to the authentication relay server 4. Receiving the authentication response packet 304, the authentication relay server 4 relays it to the edge router 2 as an authentication response packet 305.

Figure 14:
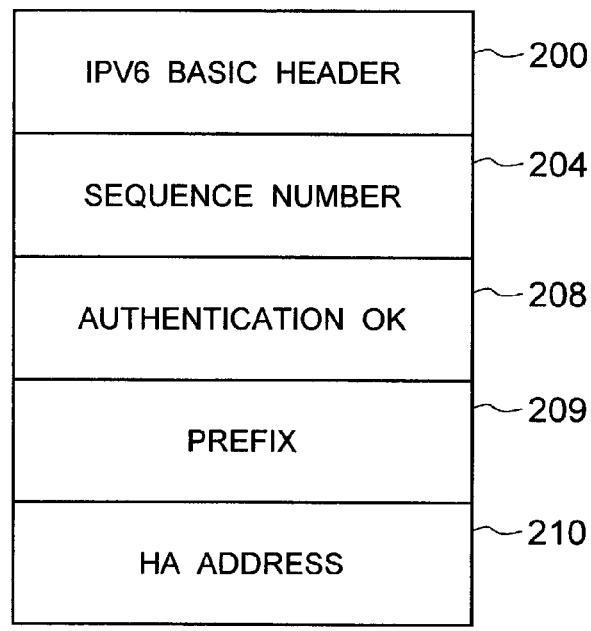
FIG. 14 is a format diagram showing an authentication response packet 304.

Upon receiving the authentication response packet 305, the edge router 2 reads out the prefix 209 and the HA address 210 from the packet to generate a filter list 115 (FIG. 13) and then transmits it to the CPE 5 as an authentication response packet 306. The filter list generation processing will be described later. As shown in FIG. 14, each of formats of the authentication response packets 304, 305, and 306 comprises an IPv6 basic header 200, a sequence number 204, an authentication OK 208, a prefix 209, and an HA address 210.

Figure 15:
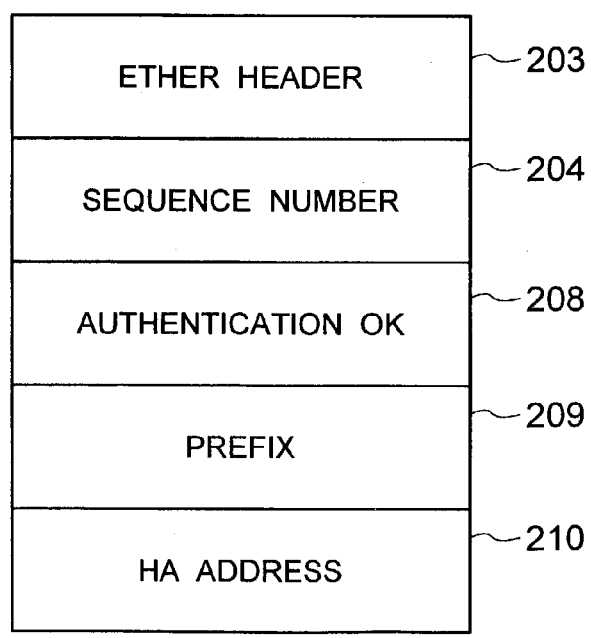
FIG. 15 is a format diagram showing an authentication response packet 307.
Figure 16:
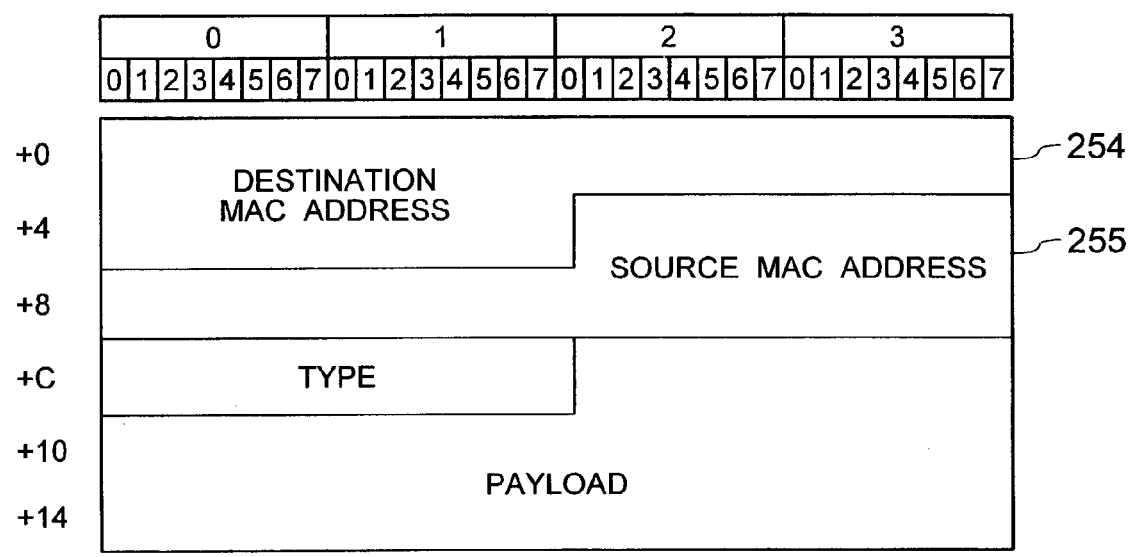
FIG. 16 is a format diagram showing an Ether header 203 of the authentication response packet 307.

Upon receiving the authentication response packet 306, the radio base station 20 adds the Ether header and the IPv6 basic header 200 to the Ether header 203 and transmits them to the CPE 5 as an authentication response packet 307. A source address of the transmission is an MAC address and a destination address of the transmission is the MAC address of the CPE 5. As shown in FIG. 15, a format of the authentication response packet 307 comprises an Ether header 203, a sequence number 204, an authentication OK 208, a prefix 209, and an HA address 210. As shown in FIG. 16, a format of the Ether header 203 shown in FIGS. 10 and 15 comprises a destination MAC address 254, a source MAC address 255, a type, and a payload.

Receiving the authentication response packet 307, the CPE 5 sets a home address by setting high-order 64 bits of its own address to the prefix 209 of the packet. In other words, as shown in an example of FIG. 9, the CPE 5 acquires prefix 2002:1001: and then sets 2002:1001::1 as a home address.

The following describes an operation of the edge router 2 on the processing of generating the authentication request packet 302 by referring to FIG. 2.

If an authentication request packet is transmitted to the authentication packet processing unit 114, the edge router 2 adds its own ID (edge router ID) 207 at the end of the packet and transmits it to the transfer processing unit 111. The edge router ID 207 is used for selecting a prefix that the authentication server 3 allocates to the CPE 5.

Then, the packet filter 110 checks a source address 250 (See FIG. 22) of the received packet. If the prefix of the source address exists in the filter list 115, the packet is originated from the CPE 5 and therefore it is sent to the transfer control unit 113.

The transfer control unit 113 transmits the packet originated from the CPE 5 with an IPv6 path control header 202 added so that it passes through the HA 1 to the transfer processing unit 111, the line interface 112, and to the HA 1.

The following describes an operation of the authentication relay server 4 on the authentication relay processing by referring to FIG. 5.

If the packet received by the authentication relay server 4 is an authentication request packet 302, the packet analysis unit 118 takes an MISP name out of username@MISPname 205 of the payload section of the packet and acquires an address of the authentication server 3 concerned by referring to the MISP list 120. After acquiring the address of the authentication server 3, the packet analysis unit 118 stores the packet in the packet storage unit 121 and transmits the packet and the address of the authentication server 3 to the packet relay unit 119.

If the packet received by the authentication relay server 4 is an authentication response packet 304, the packet analysis unit 118 takes a sequence number 204 and acquires a packet having a matching sequence number by referring to the packet storage unit 121. Then, the packet analysis unit 118 transmits a source address (the address of the radio base station 20) of the acquired packet and the authentication response packet 304 to the packet relay unit 119.

The packet relay unit 119 sets the address received from the packet analysis unit 118 to the destination IP address 251 (See FIG. 22) for the packet received from the packet analysis unit 118. It sets its own address to the source address and transmits the address to the line interface 112.

The following describes an operation of the authentication server 3 on the authentication processing described above by referring to FIG. 6.

Receiving the authentication request packet from the user, the line interface 112 sends the packet to the request analysis unit 122. The request analysis unit 122 compares the authentication request packet from the user with the contract information 124 (See FIG. 7) and authenticates a user according to whether the user name and password match with provided ones. Information on success or failure of the user authentication is given to the response generation unit 123. If the user authentication is successful, the response generation unit 123 generates an authentication success packet as a response to the authentication request packet by referring to the prefix information 125. On the other hand, if the user authentication is unsuccessful, the response generation unit 123 generates an authentication failure packet as a response to the authentication request packet. The authentication success packet or the authentication failure packet is sent to the line interface 102.

As shown in FIG. 14, the authentication success packet comprises an IPv6 basic header 200, a sequence number 204, an authentication OK 208, a prefix 209, and an HA address 210. For the sequence number 204, a content of the response request packet (FIG. 12) is copied and used as it is. The prefix 209 and the HA address 210 are generated by acquiring corresponding information, retrieving the edge router ID 207 contained in the authentication request packet from the prefix information 125.

If the user is authenticated in the MISP 8 in the above processing, the IPv6 address generated from the prefix 209 allocated to the CPE 5 is set to the CPE 5 as a home address, thereby enabling the user to use the PWC 9 network.

The home address can be previously set in the CPE 5. While only the authentication between the CPE 5 and the authentication server 3 has been described in the above embodiment, the system can be configured in such a way that an authentication is made between the authentication relay server 4 and the authentication server 3. The authentication between the servers can be performed when the MISP 8 contracts with the PWC 9 or the MCC 10. In other words, a user is authenticated between the CPE 5 and the authentication relay server 4. In addition, the authentication between the servers can be performed at the authentication of the CPE 5. In other words, the authentication relay server 4 authenticates the user, and if the authentication is successful in the authentication relay server 4, the authentication server 3 then authenticates the user. The authentication between the authentication relay server 4 and the authentication server 3 further enhances security at starting the communication.

The following describes an operation of the edge router 2 on the filter list generation processing described above by referring to FIG. 2.

If an authentication response packet is transmitted, the edge router 2 takes the prefix 209 and the HA address 210 out of the packet payload 201, associates them with each other, and adds them to the filter list 115 for storage.

An example of the filter list 115 is shown in FIG. 13. The filter list 115 contains the prefix 130 of the source address and the HA 1 address corresponding to it. Referencing the list gives information on the correspondence between the CPE 5 and the HA2 on which the positional information of the CPE 5 is registered. Therefore, the edge router 2 can learn which CPE 5 can transmit the authentication request packet to the authentication server 3 of the MISP 8 and which HA 1 the MISP 8 has, as well as to which MISP 8 the authentication is performed.

Figure 17:
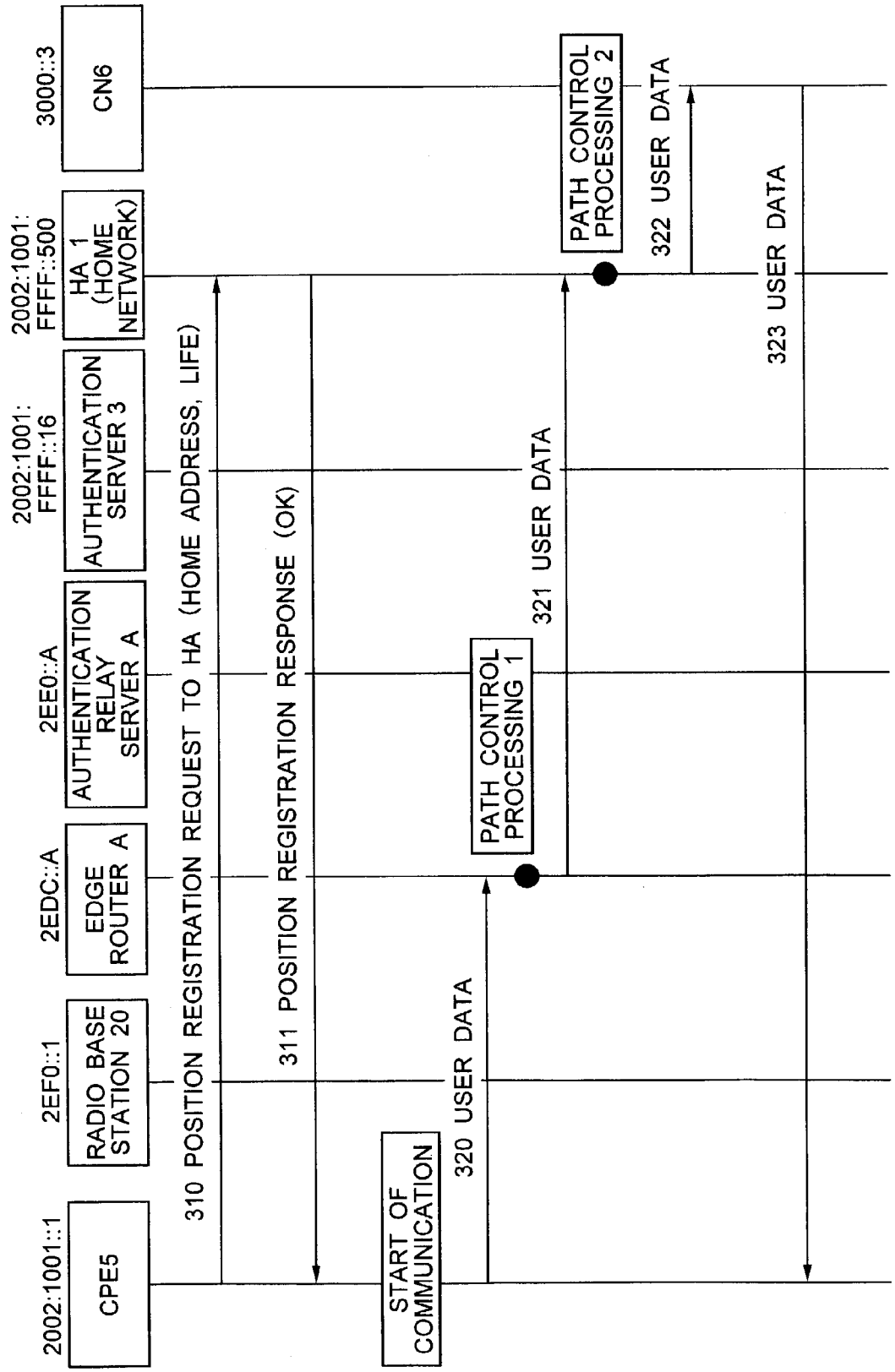
FIG. 17 is a sequence diagram showing a processing flow in positional information registration and data communication after the CPE completes the authentication of the MISP.

Referring to FIG. 17, there is shown a sequence diagram illustrating a processing flow in the positional information registration and the data communication after a completion of the CPE authentication to the MISP.

The IPv6 path control function is used so that the packet transmitted from the user certainly passes through the MISP 8. The path control function is to specify a device to be passed through on a packet transfer path to the other end of the communication in terms of address. The device to be certainly passed through is assumed to be an HA 1 installed in the MISP 8.

First, the CPE 5 transmits a position registration request packet 310 to the HA 1 in order to register the positional information of the CPE 5 on the HA 1. Upon receiving the position registration request packet 310, the HA 1 transmits a position registration response packet 311 to the CPE 5.

Figure 18:
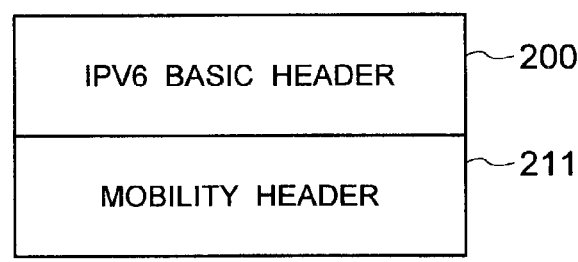
FIG. 18 is a format diagram showing a position registration request packet 310 and a position registration response packet 311.
Figure 19:
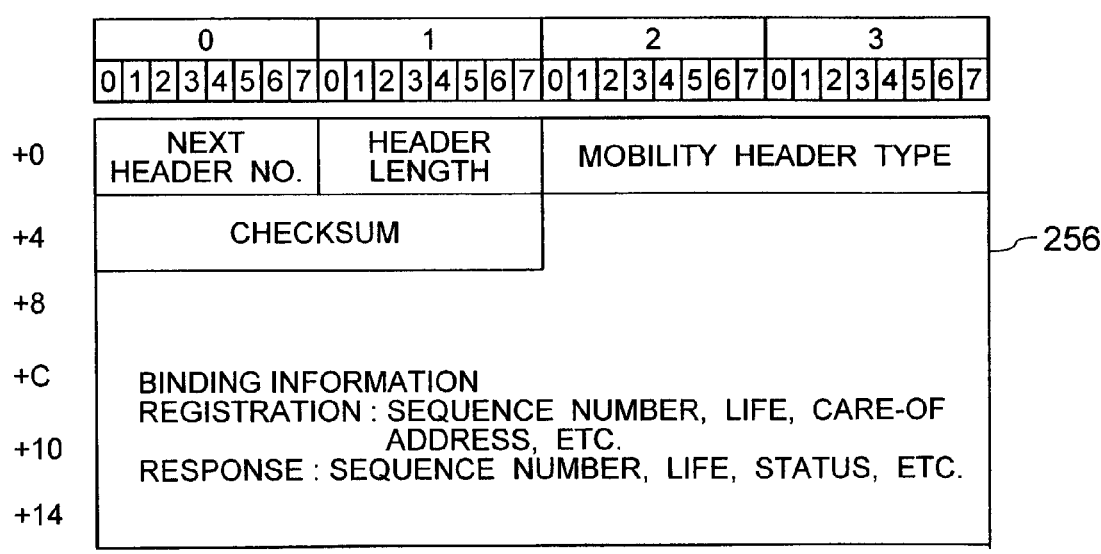
FIG. 19 is a format diagram showing details of a mobility header 211 for the position registration request packet 310 and the position registration response packet 311.

A format of the position registration request packet 310 or of the position registration response packet 311 comprises an IPv6 basic header 200 and a mobility header 211 as shown in FIG. 18. The mobility header 211 comprises a mobility header type, binding information, and the like as shown in FIG. 19. The mobility header type indicates a type of a message indicated by the mobility header (for example, "request" or "response"). The binding information contains a sequence number, life duration, a home address, a care-of address, and the like at a registration request or a sequence number, life duration, a status (a response to a request), and the like at a request response.

Since the CPE 5 may travel to another network, the CPE 5 presets life duration of the position registration request and then transmits a position registration request packet 310 again to the HA 1 after an elapse of a certain period of time to repeat the position registration.

After a completion of the position registration, the CPE 5 can start communication.

The following describes an operation of the HA 1 in the position registration processing by referring to FIG. 3.

When the HA 1 receives the position registration request packet 310 from the CPE 5, the binding processing unit 116 generates a binding cache 109. In other words, new information is added to the list showing the correspondence of the home address, the care-of address, and the life duration into storage to generate binding cache information (See FIG. 4).

Subsequently, the binding processing unit 116 generates the position registration response packet 311 to the position registration request and sends it to the transfer processing unit 111. The transfer processing unit 111 sends the position registration response packet 311 to the line interface 112 to transmit it to the CPE 5.

The following describes a processing flow for the CPE 5 to communicate with the CN 6 connected to the Internet 7 by referring to FIG. 17.

A user data packet 320 transmitted from the CPE 5 to the CN 6 is sent to the edge router 2 via the radio base station 20. The edge router 2 rewrites all data packets transmitted from the CPE 5 into packets passing through the HA 1 (path control processing 1). A user data packet 320 transmitted from the CPE 5 always passes through the edge router 2 via the radio base station and therefore the edge router 2 can acquire all the packets from the CPE 5 to perform the path control processing 1.

A user data packet 321 rewritten to pass through the HA 1 in the path control processing 1 is sent to the HA 1. Receiving the user data packet, the HA 1 deletes the path control information rewritten in the edge router 2 to resume the same condition as for the original user data packet 320 (path control processing 2). The user data packet 322 rewritten in the path control processing 2 is sent to the CN 6 in the normal packet transfer processing. In other words, after passing through the HA 1, it becomes completely the same packet as the original packet. In addition, the CN 6 can be informed of the CPE 5 address from the received user data packet 322 and therefore a user data packet 323 to be sent from the CN 6 to the CPE 5 only requires setting of the CPE address (2002:1001::1) without a need for the path control in the HA 1 nor the edge router 2.

Figure 20:
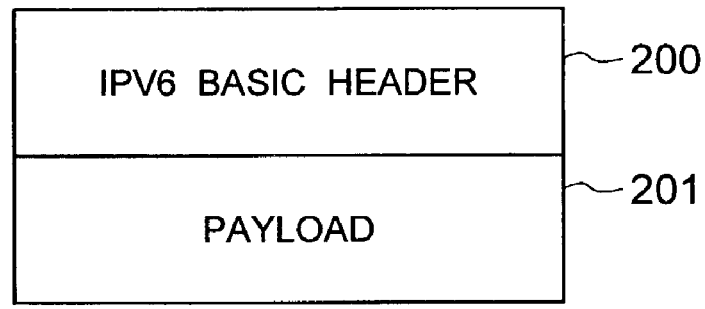
FIG. 20 is a format diagram showing a user data packet 320.
Figure 21:
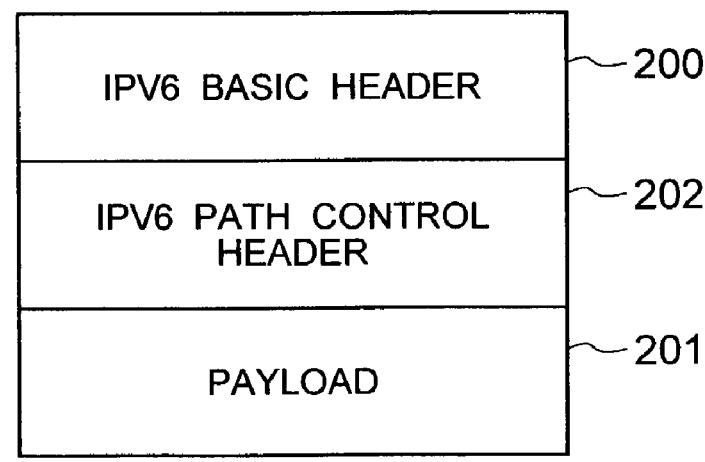
FIG. 21 is a format diagram showing a user data packet 321.
Figure 22:
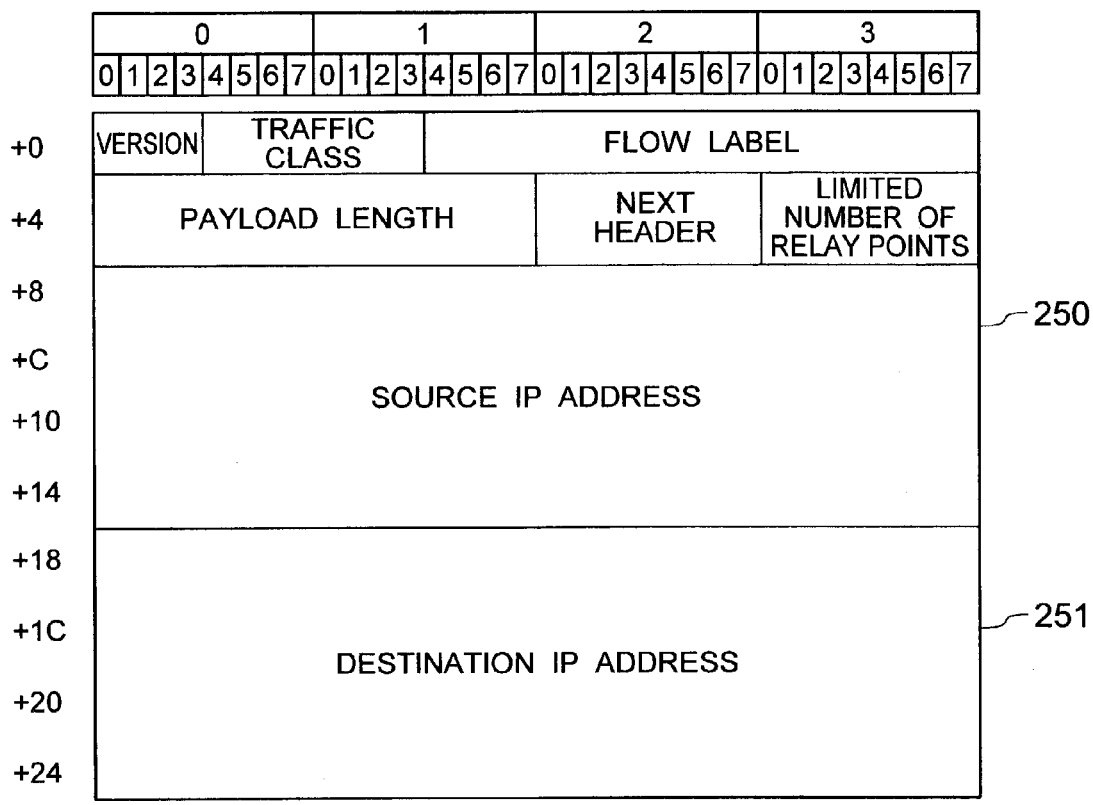
FIG. 22 is a format diagram showing details of an IPv6 basic header 200 of the user data packet.
Figure 23:
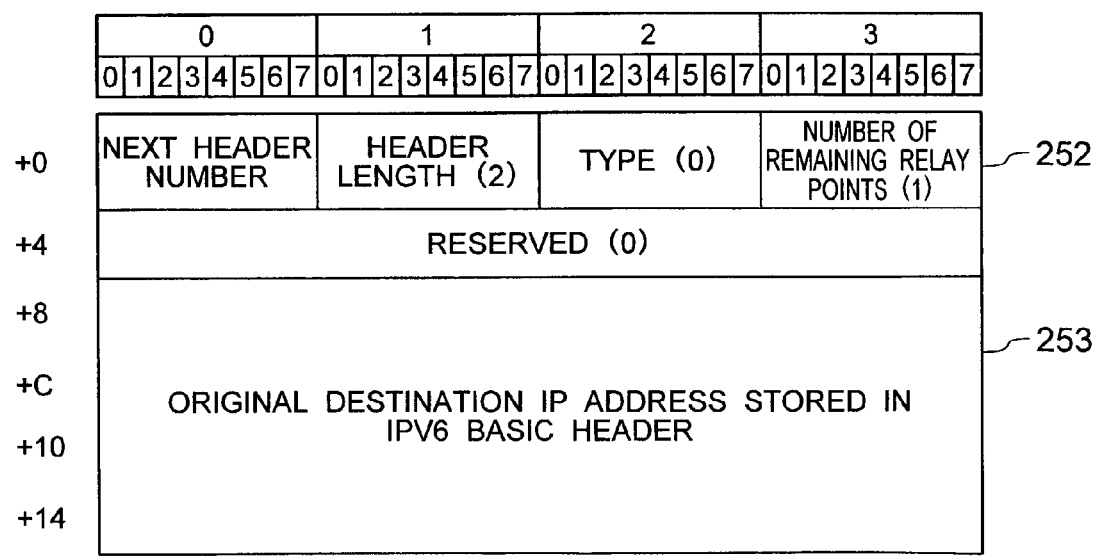
FIG. 23 is a format diagram showing details of an IPv6 path control header 202 of the user data packet.

Each of the user data packets 320 and 322 comprises the IPv6 basic header 200 and the payload 201 as shown in FIG. 20. As shown in FIG. 21, the user data packet 321 has further a path control header 202 in addition to the IPv6 basic header 200 and the payload 201. As shown in FIG. 22, the IPv6 basic header 200 of the user data packet comprises a source IP address 250, a destination IP address 251, and the like. The IPv6 path control header 202, as shown in FIG. 23, comprises a destination IP address 253 stored in the IPv6 basic header, the number of remaining relay points 252, and the like.

The following describes an operation of the edge router 2 in the path control processing 1 described above by referring to FIG. 2.

The authentication packet processing unit 114 monitors an authentication packet exchanged between the CPE 5 and the authentication server 3.

When the edge router 2 receives a packet, the packet is sent from the line interface 112 to the packet filter 110. The packet filter 110 checks the destination address 251 of the received packet; if the destination address is of the authentication relay server 4 or of the radio base station, the packet is sent to the authentication packet processing unit 114. If the prefix of the destination address 251 exists in the filter list 115, the packet is addressed to the CPE 5 and therefore it is sent directly to the transfer processing unit 111 and the line interface 112, so that the packet is transmitted to the CPE 5.

Next, the packet filter 110 checks the source address 250 of the received packet. If the prefix of the address exists in the filter list 115 at this point, the packet is transmitted from the CPE 5 and therefore it is sent to the transfer control unit 113.

The transfer control unit 113 adds the IPv6 path control header 202 so that the packet from the CPE 5 passes through the HA 1. Details of the path control header 202 are, as shown in FIG. 23, the destination address of the original packet at 253 and the number of remaining relay points set to 1 at 252. The destination address 251 of the IPv6 basic header 200 is set to the HA 1 address. The path control header 202 is inserted between the basic header 200 and the payload 201 (See FIG. 21). The processed packet is sent to the transfer processing unit 111 and the line interface 112, so that it is transmitted to the HA 1.

The following describes an operation of the HA 1 in the path control processing 2 described above by referring to FIG. 3.

The encapsulation processing unit 117 deletes the path control header 202 inserted by the edge router 2 to perform the path control processing 2. In the path control processing 2, the original destination address stored in the path control header 202 is set to the destination address 251 of the IPv6 basic header 200. The processed and generated packet is transmitted to the transfer processing unit 111, the line interface 112, and then to the CN 6.

Figure 24:
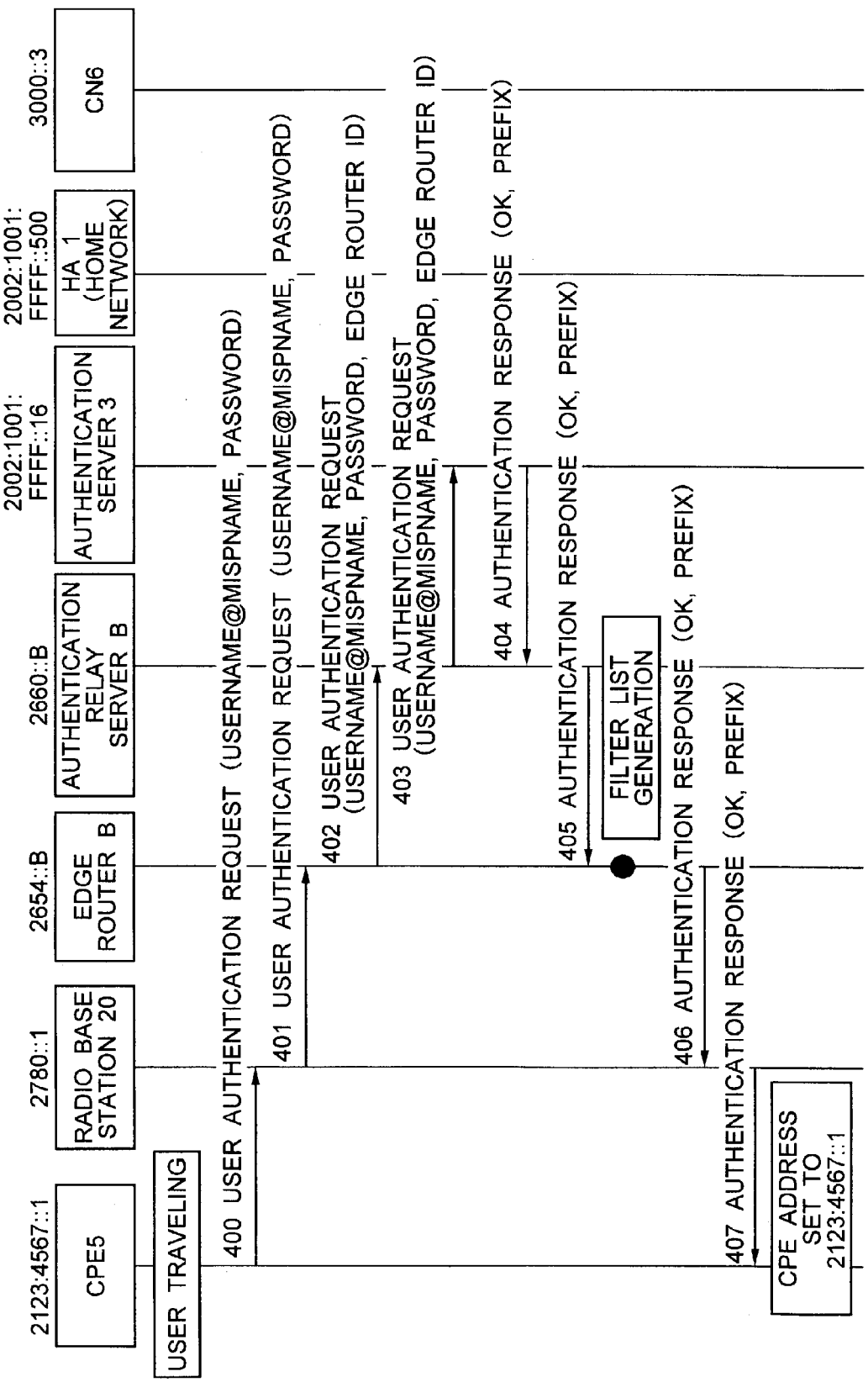
FIG. 24 is a sequence diagram showing a processing flow in new authentication caused by roaming of the CPE 5.

Referring to FIG. 24, there is shown a sequence diagram illustrating a processing flow in roaming of the CPE 5 from the PWE 9 to the MCC 10 when the CPE 5 travels.

When the CPE 5 traveled from the PWC 9 to the MCC 10, the user is authenticated anew. The processing flow is the same as for the processing described in FIG. 9, except that the authentication response packet 404 does not contain the HA address 210. It is because the HA address 210 has already been authenticated once and previous notice of the HA address 210 is given. The CPE 5 address set in this authentication processing differs from the home address set in FIG. 9 and it is set as a local address (a care-of address) of the MCC 10 to which the CPE 5 travels. In other words, in the example of FIG. 24, the care-of address of the CPE 5 is set to 2123:4567::1.

The CPE 5 notifies the HA 1 of its own care-of address in the position registration processing described below. The HA 1 registers the correspondence between the CPE 5 home address and the notified care-of address on the binding cache 109 and controls a communication between the CPE 5 and the CN 6 so that the MISP 8 communicates with the CPE 5 by using the care-of address and that the MISP 8 communicates with the CN 6 by using the home address.

With this, the CPE 5 address viewed from the CN 6 is always the same address (home address). Therefore, even if the CPE 5 travels to another network by roaming, continuous communication is achieved between the CPE 5 and the CN 6.

Figure 25:
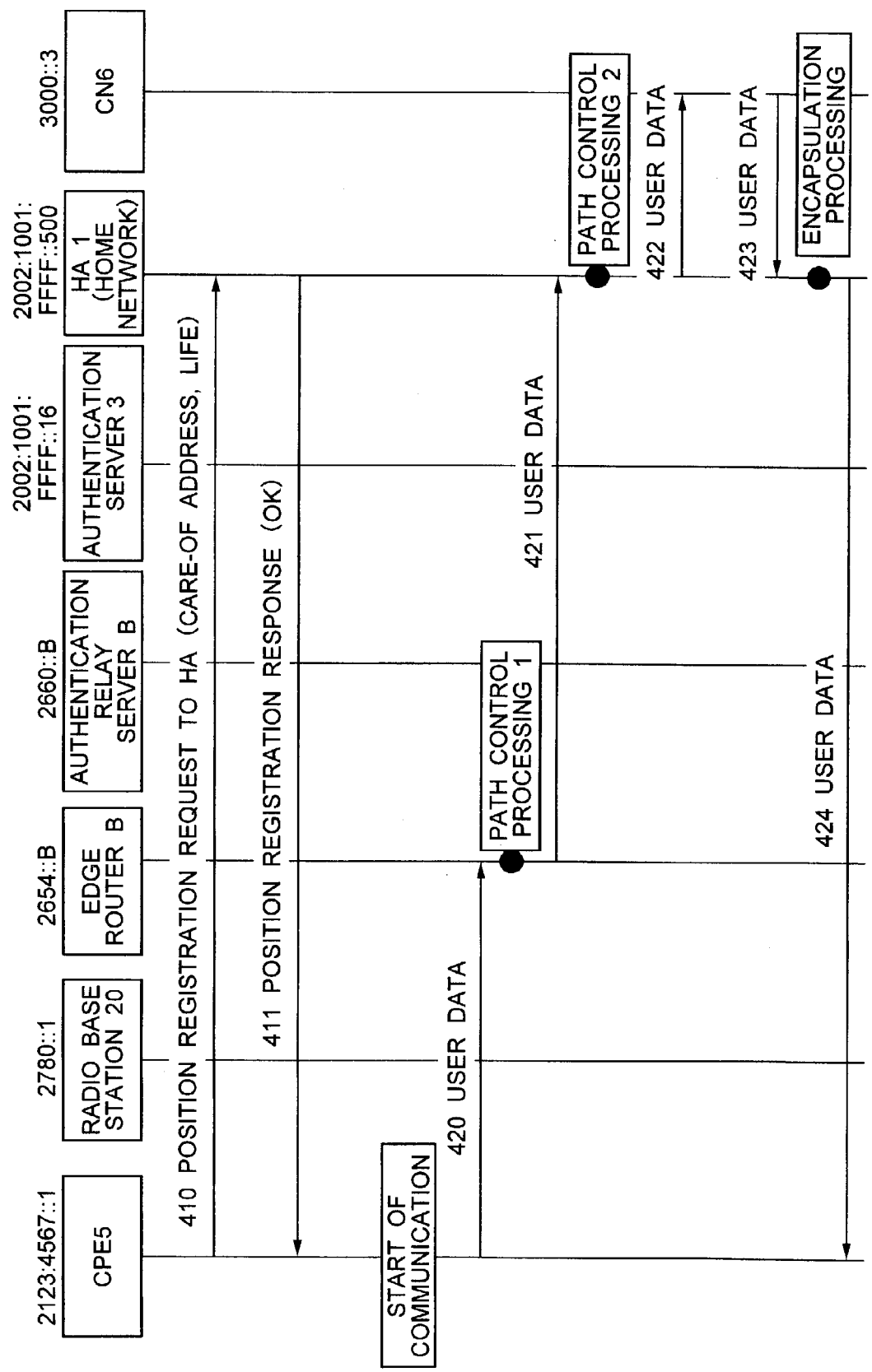
FIG. 25 is a sequence diagram showing a processing flow in positional information registration and data communication after a completion of the CPE roaming.

Referring to FIG. 25, there is shown a sequence diagram illustrating a processing flow in the positional information registration and the data communication after a completion of the CPE roaming.

This processing is also the same as the processing described in FIG. 17, except that encapsulation processing is performed in a data transmission from the CN 6 to the HA 1. It is because the CPE 5 communicates with the MISP 8 by using the care-of address after roaming which requires a conversion between the care-of address and the home address.

The following describes an operation of the HA 1 in the encapsulation processing described above by referring to FIG. 3.

The HA 1 compares the destination address 251 of the received packet with the binding cache 109; if a matching entry exists in the binding cache 109, the HA 1 performs encapsulation processing of the packet. In the encapsulation processing, the IPv6 basic header 220 of a new destination is added and IPv6 basic header 200 and the payload 201 of the original packet are converted to a payload section.

Figure 26:
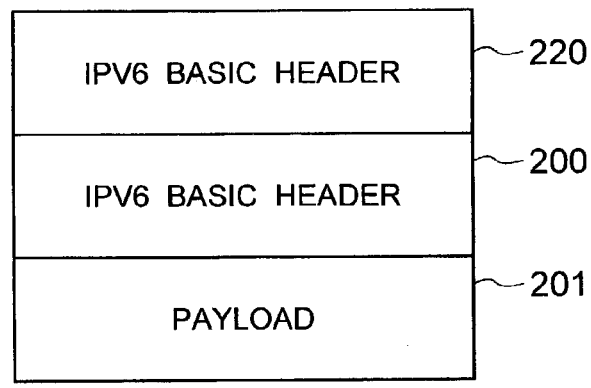
FIG. 26 is a format diagram showing a packet after encapsulation processing.
Figure 27:
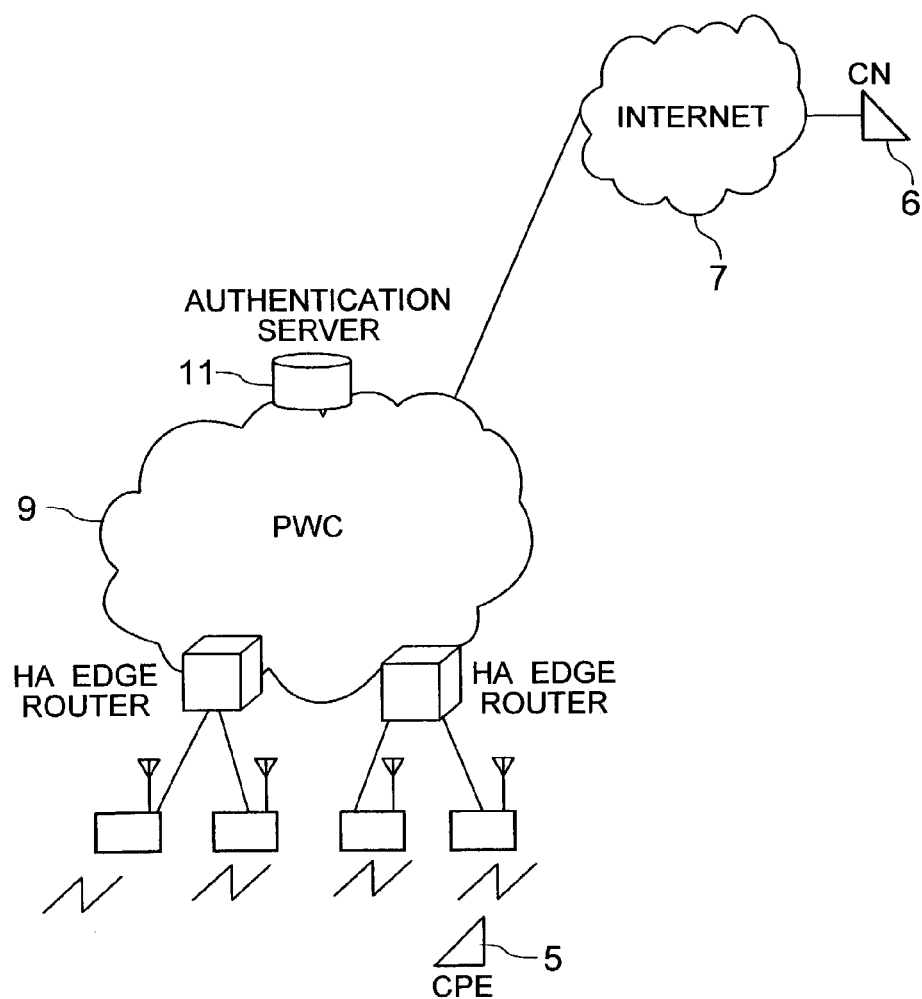
FIG. 27 is a schematic diagram showing a conventional wireless network system.

The packet after the encapsulation processing has a format as shown in FIG. 26. The IPv6 basic header 220 is added in this processing. The destination address of the IPv6 basic header 220 is the care-of address of the CPE 5 obtained from the binding cache 109 and the source address is the own address of the HA 1.

The encapsulation processing enables the continuous communication between the CPE 5 and the CN 6 even if the CPE 5 travels to another network by roaming. While the roaming from the PWC 9 to the MCC 10 has been described in this embodiment, the same processing content is applicable to roaming from the MCC 10 to the PWC 9, from the PWC 9 to another PWC, or from the MCC 10 to another MCC, for example.

In the first embodiment configured as set forth in the above, the MISP 8 contracting with the CPE 5 has the authentication server 3 for authenticating the CPE 5 and the HA 1 for managing the positional information of the CPE 5, by which a user can use a plurality of mobile networks only by contracting with the MISP 8.

Furthermore, even if the CPE 5 is given an IP address (home address) at a power-on timing or other first mobile network connection and a new IP address (care-of address) after roaming of the CPE 5 traveling to another mobile network, the system grasps the positional information of the CPE 5 in the HA 1 and the correspondence between the home address and the care-of address and performs path control processing with an address conversion, by which the CPE 5 can make roaming easily and achieve continuous communication without any improper disconnection of communication data after roaming.

A second embodiment of the present invention will now be described below.

While the IPv6 path control function is used so that the packet transmitted from the CPE 5 always passes through the MISP 8 in the first embodiment, the second embodiment differs from the first embodiment in using such a method that an IP packet is encapsulated in an IP packet (IP in IP encapsulation method) instead. Components giving the same actions as in the first embodiment are designated by the same reference numerals and their description is omitted here.

Since a packet from the CPE 5 always passes through the edge router 2, the edge router 2 performs the IP in IP encapsulation processing. A packet processed in the IP in IP encapsulation processing has a format as shown in FIG. 26. In other words, the IPv6 basic header 220 is added in the edge router 2. At this point, the destination address 251 (See FIG. 22) is set to the HA 1 address and the source address 250 is set to the edge router 2 address. With this, packets transmitted from the CPE 5 are encapsulated in the edge router 2 and all of them are transmitted to the HA 1 in the MISP 8. In the HA 1, the IPv6 basic header 220 is removed and the IPv6 basic header 200 of the original packet is used as a new header for transfer processing.

As described above, the IP in IP encapsulation processing causes all the packets from the CPE 5 to be processed so that they pass through the HA 1, by which the CPE 5 can make roaming in the same manner as in the first embodiment and achieve continuous communication without any improper disconnection of communication data after the roaming.

While the format is shown for a case of IPv6 in FIG. 26, the same IP in IP encapsulation processing can be exactly achieved in the Internet Protocol Ver. 4 (IPv4). Therefore, while the first embodiment is applicable to the IPv6 network only, the second embodiment is applicable to the IPv4 network, too.

The following describes a third embodiment of the present invention.

While the IPv6 path control function is used so that a packet transmitted from the CPE 5 always passes through the MISP 8 in the first embodiment, there is used a method of encapsulating an IP packet in an IP packet in the CPE 5 (a reverse tunnel method) in the third embodiment. Components giving the same actions as in the first embodiment are designated by the same reference numerals and their description is omitted here.

In the reverse tunnel method, the CPE 5 performs the IP in IP encapsulation processing, which is performed in the edge router 2 in the second embodiment. In other words, an IPv6 basic header 220 addressed to the HA 1 is added (FIG. 26) to all the packets to be transmitted from the CPE 5 before the transmission. With this, the edge router 2 need not have the IP in IP encapsulation processing function as required in the second embodiment, by which existing facilities can be used for roaming.

The reverse tunnel processing is also applicable to IPv4 as in the second embodiment. Therefore, the third embodiment is applicable to the IPv4 network, too.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A communication system comprising a wireless terminal, a plurality of Internet Service Providers (ISPs, each ISP managing at least one terminal-side network, two or more terminal-side networks communicating with said wireless terminal, and a backbone-side network managed by an ISP different from the ISPs managing the terminal-side networks and connected to said terminal-side networks and connecting said wireless terminal with a backbone network, the wireless terminal traveling between said terminal-side networks during communication, wherein each of said terminal-side networks has a relay device for relaying communication between said wireless communication terminal and said backbone-side network, and wherein said backbone-side network has a position management device for managing positional information of said wireless terminal and an authentication device for authenticating said wireless terminal according to contract information of said wireless terminal, wherein each of said terminal-side networks has an authentication data relay device for relaying authentication data in which said wireless terminal requests an authentication from said authentication device, wherein said relay device has an identification-information correspondence information generation device for generating correspondence information between identification information of a network to which said wireless terminal belongs and identification information of said position management device, and wherein said identification-information correspondence information generation device extracts the identification information of the network to which said wireless terminal belongs and the identification information of said position management device from the information transmitted from said position management device to said wireless terminal to generate said identification-information correspondence information, and a path control device for controlling a path of a packet in packet communication of said wireless terminal so that the packet transmitted by said wireless terminal passes through said position management device by referring to said identification-information correspondence information.

2. The communication system according to claim 1, wherein said path control device changes a destination of a packet in packet communication of said wireless terminal so that said packet passes through said position management device by referring to said identification-information correspondence information.

3. The communication system according to claim 1, wherein said position management device transfers the packet transmitted by said wireless terminal and controlled to pass through the position management device to a regular destination.

4. The network system according to claim 1, wherein said identification information is an address complying with IPv6.

5. The network system according to claim 1, wherein said identification information is an address complying with IPv4.

6. A relay device for use in a communication system including a wireless terminal, two or more terminal-side networks communicating with said wireless terminal, a plurality of Internet Service Providers (ISPs), each ISP managing at least one terminal-side network, and a backbone-side network managed by an ISP different from the ISPs managing the terminal-side networks, said backbone-side network being connected to said terminal-side networks and connecting said wireless terminal with a backbone network, which connects said wireless terminal and a backbone network, and a position management device for managing positional information of said wireless terminal, wherein the wireless terminal travels between said terminal-side networks during communication, the relay device relaying communication between said wireless communication terminal and said backbone-side network and installed in said terminal network, comprising an identification-information correspondence information generation device, wherein said identification-information correspondence information generation device extracts the identification information of the network to which said wireless terminal belongs and the identification information of said position management device from information transmitted from said position management device to said wireless terminal, and generates correspondence information between identification of the network to which said wireless terminal belongs and identification of said position management device; and a path control device for controlling a path of a packet in packet communication of said wireless terminal so that the packet transmitted by said wireless terminal passes through said position management device by referring to said identification-information correspondence information.

7. The relay device according to claim 6, wherein said path control device changes a destination of a packet in packet communication of said wireless terminal so that said packet passes through said position management device by referring to said identification-information correspondence information.

8. The relay device according to claim 6, wherein said identification information is an address complying with IPv6.

9. The relay device according to claim 6, wherein said identification information is an address complying with IPv4.

* * * * *